US008302166B2

(12) United States Patent
Balakrishnan et al.

(10) Patent No.: US 8,302,166 B2
(45) Date of Patent: Oct. 30, 2012

(54) ASSOCIATING NETWORK DEVICES WITH USERS

(75) Inventors: Shobana M. Balakrishnan, Redmond, WA (US); Mudit Goel, Redmond, WA (US); Dinan Srilal Gunawardena, Cambridge (GB); Dave Maltz, Bellevue, WA (US); Michael Schroeder, Cupertino, CA (US); Fan Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 12/032,960

(22) Filed: Feb. 18, 2008

(65) Prior Publication Data

US 2009/0210932 A1    Aug. 20, 2009

(51) Int. Cl.
*G06F 15/16* (2006.01)
*H04W 4/00* (2009.01)
*H04L 12/66* (2006.01)
*H04M 3/00* (2006.01)

(52) U.S. Cl. ............ 726/5; 455/418; 455/419; 370/338; 370/353

(58) Field of Classification Search .................. 726/5–7; 709/224
See application file for complete search history.

(56) References Cited

U.S. PATENT DOCUMENTS

| 2002/0073329 A1 | 6/2002 | Brombal |
| 2002/0120742 A1 | 8/2002 | Cherry |
| 2003/0080992 A1 | 5/2003 | Haines |
| 2003/0095524 A1* | 5/2003 | Stephens et al. ............... 370/338 |
| 2003/0208595 A1 | 11/2003 | Gouge et al. |
| 2004/0203381 A1 | 10/2004 | Cahn et al. |
| 2005/0136905 A1* | 6/2005 | Son et al. ........................ 455/418 |
| 2005/0138157 A1 | 6/2005 | Jung et al. |
| 2005/0138410 A1 | 6/2005 | Masuouka et al. |
| 2005/0193143 A1 | 9/2005 | Meyers et al. |
| 2005/0272408 A1 | 12/2005 | Wilkes-Gibbs et al. |
| 2006/0010199 A1 | 1/2006 | Brailean et al. |
| 2006/0178214 A1 | 8/2006 | Lehikoinen et al. |
| 2007/0180082 A1 | 8/2007 | Abraham et al. |

FOREIGN PATENT DOCUMENTS

| KR | 20050058921 A | 6/2005 |
| KR | 20070115230 A | 12/2007 |

OTHER PUBLICATIONS

PCT Search Report for PCT/US2009/032765 (citing U.S. Appl. No. 12/032,960 as priority), Sep. 15, 2009, 10 pages.
Technical Developments 2020. Draft B—Jan. 22, 2000. BMJ Publishing Group Ltd. http://www.bmj.com/cgi/content/full/320/7236/DC1/5. Last accessed Aug. 8, 2007.
StillSecure VAM http://www.stillsecure.com/docs/StillSecure_VAM_tech_sum.pdf. Last accessed Aug. 8, 2007.

* cited by examiner

*Primary Examiner* — Ashok Patel
*Assistant Examiner* — Evans Desrosiers
(74) *Attorney, Agent, or Firm* — Lee & Hayes, PLLC

(57) ABSTRACT

Systems, devices, and methods for associating network devices with users are described, which can facilitate establishing a secure user to network device association. In various embodiments, the disclosed subject matter facilitates devices providing indication of location and device identity to a user and recognizing the user is in the proximity of the device. The disclosed subject matter provides efficient and secure device to user association and can facilitate performing customized actions based on the nature of the association.

18 Claims, 8 Drawing Sheets

ASSOCIATING NETWORK DEVICES WITH USERS

TECHNICAL FIELD

The subject disclosure relates to network systems and more particularly to associating network devices with users.

BACKGROUND

Networks are widely used to interconnect various types of devices. Examples of networks can include wireless and wired local area networks (LANs), wide area networks (WANs), personal area networks (PANs), metropolitan area networks (MANs), cellular and telephone networks, the Internet, etc. Examples of devices interconnected by networks can include desktop computers, portable computers and handheld devices, network telephones, network enabled printers, copiers, cellular devices, multifunction devices and other appliances (either information technology (IT) appliances or otherwise), etc.

A network, such as a network within an organization, can interconnect numerous network devices. Typically, devices such as printers, copies, and the like provide services, are shared among a number of users, and are located centrally according to anticipated demand. Conversely, devices such as computers and handheld devices provide user network access and can be shared or designated to a particular user or user class as the situation demands.

Although the evolution of technology has provided powerful systems and enabled more efficient performance of complex tasks, the initial setup and association of a device with a user remains complex and daunting for even the most simple task. It is now extremely common for users to wish to associate themselves with a networked device. For example, the purpose of association may be physically locating the networked device, creating a communication channel between the user (e.g., a secure channel, in which case this would require creating a secured association), and/or releasing or authorizing the use of resources on the device (e.g., authorizing a user to use a specific printer).

However, bootstrapping or associating the connection between the network devices and users using them still requires significant human intervention. Consider, for example, an employee attempting to print a document for the first time after arriving in a new office space. If the nearest networked printer has not already been set up on the employee's computer by experienced and knowledgeable IT staff, then the user must go about seeking out a suitable printer, determine the proper information required to set up the printer on the employee's computer, go through any required setup programs and device driver installation programs, and then possibly print a test page to ensure success.

In addition, many configuration and management interfaces for networked devices operate under the often-unfounded assumption that the user configuring the device is sufficiently technically capable to locate and identify the correct physical device and determine proper set up information. As the number of devices networked together on a site increases and/or the size and complexity of the network increases, the issue of locating the correct device becomes increasingly overwhelming. Significantly, such a set up routine would be required for each additional device that the employee has occasion to use.

Moreover, any one of the steps in the setup routine is prone to human error, which can result in lost productivity and user frustration. Moreover, measures in place to enhance security or privacy, such as authentication or privacy protections, can further provide opportunity for user error as a result of the tradeoffs between usability, security, and privacy protection. In some instances, a frustrated user may give up and abandon the attempt, which can result in lost future productivity due to the employee's avoidance of setting up IT assets provided to improve worker productivity. In other instances, the frustrated user may turn to IT support staff for assistance, which can lead to IT staff's reduced availability for attending to more complex tasks. In turn, this can lead to higher IT support costs. Thus, a technique that makes this association effortless and secure will reduce the cost of managing and supporting network devices.

Conventional solutions to device association are point solutions that either assume that the user knows the location of the device or omit the user from the association process. As an example, Bluetooth™ pairing involves selecting menu items or pressing buttons on devices such as a cell phones and headsets in a non-intuitive manner. By design, the Bluetooth™ pairing method assumes that the user possesses the devices to be associated or is at least in close proximity with the devices. Thus, the user presumably already knows the location of the devices as a precondition of the pairing operation. In addition, the pairing does not really associate the user with either device, because after the pairing occurs, anyone or no one can use the device without affecting the paired devices. In other words, the use of the paired devices by a user is incidental to the pairing between of the devices.

In addition, although a password might be considered as an adequate mechanism for creating a secure association between a user and a device, this leaves open to human interaction the requirement of physically locating the correct networked device. This is a more subtle issue than at first glance, because even in home networking environments, while there may only be a small number of devices that are networked, the expertise of the user might be such that they do not know where the device is on a network, what its indications describe, how to enter a password, or otherwise interact with the device.

As a further example, a proximal user interacting or associating with a device by using a radio frequency smart card, such as a corporate identification card, can create a secure association between the user and the device. However, this presumes that the user has already located the device and still requires significant human interaction to run and configure the required setup programs and device driver installation programs.

Moreover, there are numerous security exploits that can be performed by a rogue device or software component masquerading as a legitimate device or process. For example, if a user is required to enter security credentials on a terminal, a compromised terminal masquerading as an intended device that the user wishes to associate with can surreptitiously capture the user's credential.

The above-described deficiencies are merely intended to provide an overview of some of the problems encountered in associating network devices with users, and are not intended to be exhaustive. Other problems with the state of the art may become further apparent upon review of the description of the various non-limiting embodiments of the disclosed subject matter that follows.

SUMMARY

In consideration of the above-described deficiencies of the state of the art, the disclosed subject matter facilitates associating network devices with users by associating device location with a device and communicating the location information to a user in an efficient and meaningful way to facilitate associating the device with the user and/or the user with the device.

In consideration of the above-described limitations, in accordance with exemplary non-limiting embodiments, the disclosed subject matter facilitates association of network devices with users. Accordingly, methods are provided that comprise initiating a device discovery on behalf of the user. The methods also include presenting a set of device or function candidates for selection. The methods further include identifying and locating a device of interest based on an indication generated by the device of interest. In addition, the methods include interacting with the device of interest to facilitate device recognition of the user and creating a communication channel with the device of interest based on identifying the device of interest and device recognition of the user. Moreover, the methods can include performing a customized action based on creating the communication channel with the device of interest.

In consideration of the above-described limitations, in accordance with further non-limiting embodiments, the disclosed subject matter facilitates association of network devices with users. Accordingly, methods are provided that comprise responding to a device discovery query. The methods also include providing an indication to facilitate determining physical location and device identification in response to receiving a device selection notification on behalf of the user. The methods further include recognition by the network device that the user is in the proximity of the network device. In addition, the methods include establishing a communication channel with the user based on recognizing that the user is in the proximity of the network device. Moreover, the methods can include performing a customized action based on proximity of the user, a user profile, a device usage history, user local selections, device inventory or audit, nature of the communication channel, and/or user authentication credentials, and the like.

In further consideration of the above-described limitations, various embodiments of the disclosed subject matter provide devices and systems that facilitate associating network devices with users.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the disclosed subject matter in a simplified form as a prelude to the more detailed description of the various embodiments of the disclosed subject matter that follows.

BRIEF DESCRIPTION OF THE DRAWINGS

Methods for associating network devices with users, and related systems and devices are further described with reference to the accompanying drawings in which.

DETAILED DESCRIPTION

Overview

Figure 1:
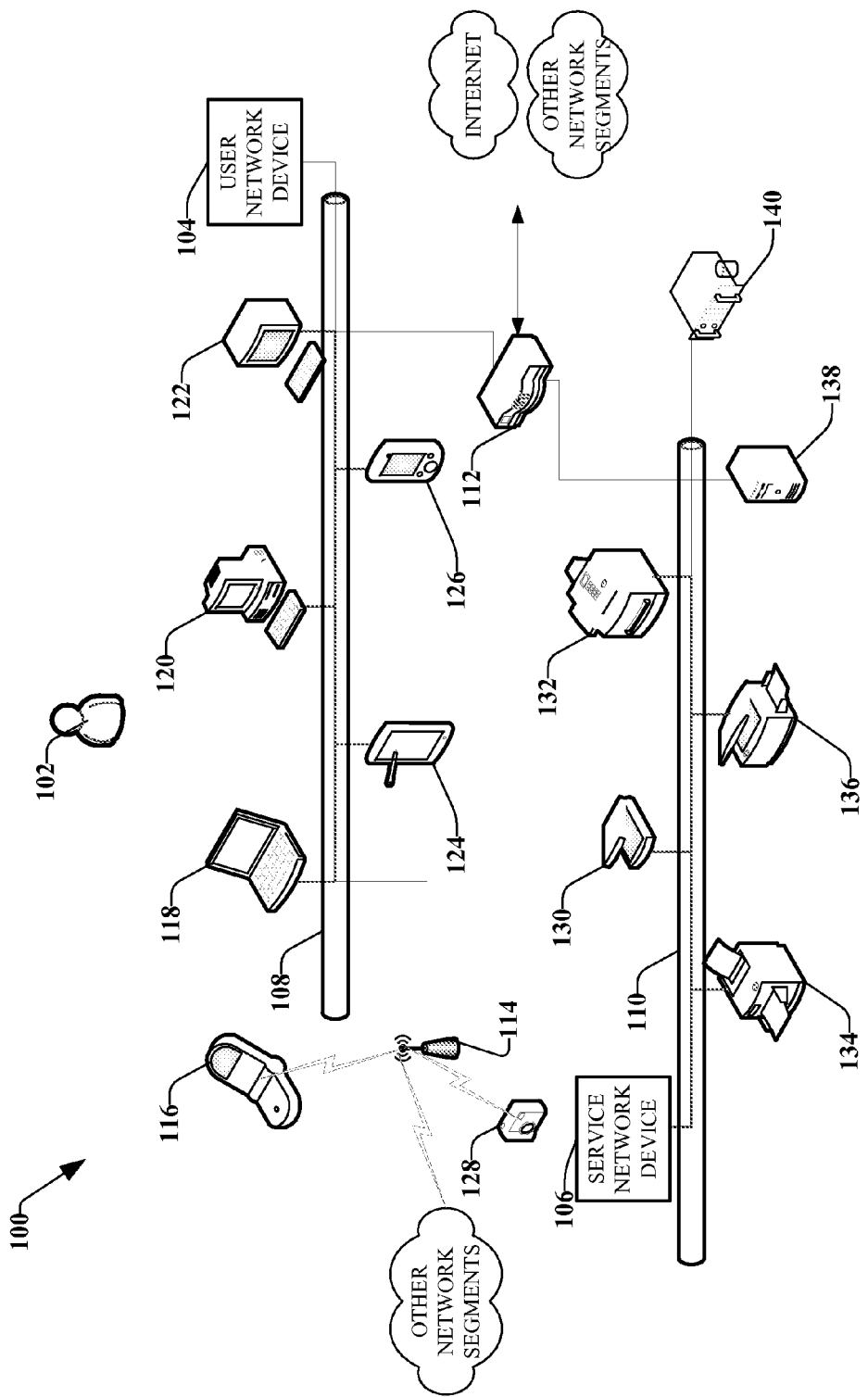
FIG. 1 illustrates an overview of an exemplary computing environment suitable for incorporation of embodiments of the disclosed subject matter.

Simplified overviews are provided in the present section to help enable a basic or general understanding of various aspects of exemplary, non-limiting embodiments that follow in the more detailed description and the accompanying drawings. This overview section is not intended, however, to be considered extensive or exhaustive. Instead, the sole purpose of the following embodiment overviews is to present some concepts related to some exemplary non-limiting embodiments of the disclosed subject matter in a simplified form as a prelude to the more detailed description of these and various other embodiments of the disclosed subject matter that follow. It is understood that various modifications may be made by one skilled in the relevant art without departing from the scope of the disclosed subject matter. Accordingly, it is the intent to include within the scope of the disclosed subject matter those modifications, substitutions, and variations as may come to those skilled in the art based on the teachings herein.

As used in this application, the terms "component," "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

In addition, various embodiments of the disclosed subject matter are directed to methods. It is to be understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The method claims appended hereto present elements of the various steps in a sample order, and are not meant to be limited to the specific order or hierarchy presented.

It is now common for users to wish to associate themselves with a networked device. For example, the purpose of association may be physically locating the networked device, creating a communication channel between the user (e.g., a secure channel, in which case this would creating a security association), and/or releasing or authorizing the use of resources on the device (e.g., authorizing a user to use a specific printer). Typically, the end goal of such an association is to create a communication path that has certain properties between a user and a device on a computer network for the purposes of performing some task of interest to the user.

Accordingly, the user typically first attempts to locate the correct device on the network and/or the physical location of the device. For example, there can be many devices in the network, which can make it difficult to locate and identify the correct device, without some sort of user recognizable output from the device. Secondly, once the user has located and identified the correct device, the user then has to initiate some mechanism to facilitate creating an association with the correct device and user so that an intended task is performed by the correct device and the correct user. In addition, a secure channel can be desired by the user and/or an organization's security or privacy policy, as well as desiring the ability to perform a customized action upon successful association with a device.

Thus, the disclosed subject matter facilitates associating network devices with users in a secure fashion and in a manner that is tangible or salient to the users. Advantageously, the disclosed subject matter overcomes many of the difficulties encountered in the conventional manual device set up routines by avoiding the inherent technical difficulties and opportunities for human error. For purposes of illustration, the disclosed subject matter can comprise locating the correct device and creating the communication channel desired to accomplish a desired task. Additionally, locating the correct device can comprise discovery of candidate devices, user identification of the correct device, and/or device identification of the correct user. In addition, after successfully associating a network device with a user, the disclosed subject matter can facilitate performing a customized action based on the association with the user. In addition to facilitating associating network devices with users, the disclosed subject matter can facilitate further useful functions such as creating and updating a device map and/or an inventory of network devices for auditing purposes.

Associating Network Devices with Users

FIG. 1 illustrates an overview of an exemplary computing environment 100 suitable for incorporation of embodiments of the disclosed subject matter. Computing environment 100 can comprise a number of components to facilitate associating network devices with users 102 according to various aspects of the disclosed subject matter, among other related functions. While various embodiments are described with respect to the components of computing environment 100 and the further embodiments more fully described below, one having ordinary skill in the art would recognize that various modifications could be made without departing from the spirit of the disclosed subject matter. Thus, it should be understood that the description herein is but one of many embodiments that may be possible while keeping within the scope of the claims appended hereto.

According to various non-limiting embodiments, computing environment 100 can comprise user network device 104 and service network device 106 interconnected by a network. Although for purposes of illustration, the network is shown as comprised of Ethernet segments 108 and 110 connected by links to router 112 and the associated network devices, it is to be appreciated that the structure and components of the network can be modified according to system design requirements and without departing from the scope of the disclosed subject matter and the claims appended hereto. For example, a wireless access point 114 can interconnect other network segments comprising further interconnections to additional networks and network devices. As a further example, router 112 can connect to other network segments comprising further interconnections to additional network devices, network segments, connections to the internet, and so on. Additionally, network devices can conceivably connect to the system to facilitate associating network devices with users via other networking technologies and devices (not shown), such as LANs, PANs, MANs, WANs, cellular and telephone networks, and so on, using technologies such as, but not limited to, Institute of Electrical and Electronics Engineers, Inc. (IEEE) 802.3 (Ethernet), IEEE 802.11 (WiFi®), IEEE 802.15 (Zigbee®), IEEE 802.16 (WiMax™), Ultra-Wide Band (UWB), and so on.

Additionally, while user network device 104 and service network device 106 are shown as generic network capable devices, user network device 104 is intended to refer to a class of network capable devices that user 102 can use to facilitate access to a network to initiate a device association discovery step, where a device to be discovered is associated with a task, service, and/or function that the user is interested in performing or obtaining. While for purposes of illustration, the user 102 is described as initiating a device association discovery step, it is to be understood that device 104 (e.g., via an operating system and/or application software) can initiate a device association discovery step on behalf of the user. Accordingly, exemplary user network device 104 can include, without limitation, a cellular phone 116 connected to the network via access point 114 or otherwise, a laptop computer 118, a desktop computer 120, a terminal 122, a tablet personal computer (PC) device 124, and/or a personal digital assistant (PDA) 126, and so on. As further examples, user network device 104 can include such devices (not shown) as a pen computing device, portable digital music player, home entertainment devices, network capable appliances and sensors, and so on.

In addition, while service network device 106 is shown as a generic network capable device, service network device 106 is intended to refer to a class of network capable devices that can be an object of a device association discovery step, where a device to be discovered is associated with a service to be provided, perform a function, and/or perform a task as task that the user is interested in. Accordingly, exemplary user service network device 106 can include, without limitation, a network capable camera 128 connected to the network via access point 114 or otherwise, a scanner 130, a multi-function device (MFD) 132, a printer 134, and/or a copier 136, and so on. As further examples, service network device 106 can include such devices (not shown) as a network enabled refrigerator, a network enabled coffee maker, and/or any network enabled appliance or sensor, either IT appliances (e.g., network attached storage (NAS)) or otherwise, etc.

It is to be appreciated that user network device 104 and service network device 106 can comprise more or less functionality than those exemplary devices described above and can be either one or both of a user network device 104 and a service network device 106 as the context requires and as further described below in connection with FIG. 2. In addition, in some circumstances, a user network device 104 (service network device 106) can comprise a subset of the functionality of a service network device 106 (user network device 104). For example, camera 128 can include functionality to initiate a device association discovery step, for instance to discover and associate with a network connected photo printer (not shown). As a further example, PDA 126 can include camera or memory card reader functionality that can be made available and discoverable to other network devices to accomplish desired tasks or provide desired services.

According to various non-limiting embodiments of the disclosed subject matter, computing environment 100 can further comprise server 138 and/or database server 140. For example, service network device 106 and/or user network device 104 can be relatively simplistic and lacking certain features to facilitate associating network devices with users. Accordingly, particular aspects of the disclosed subject matter can be facilitated by server 138 and/or database server 140 in communication with service network device 106 and/or user network device 104. For instance, a service network device 106 can be capable of performing a customized action upon successful association, but be unable to receive a set of custom instructions directly from user 102. As a result, a set of custom instructions can be stored on a server 138 and/or database server 140 via user network device 104 and that can be received by service network device 106 from server 138 and/or database server 140. As a further example, while a service network device 106 can comprise a fingerprint reader or other user identification components in order to identify a correct user, for device marketing reasons (e.g., keeping device costs low), security reasons (e.g., centralizing access control), or other reasons, the service network device 106 can offload the authentication and/or database functions to server 138 and/or database server 140.

According to various aspects of the disclosed subject matter, computing environment 100 can facilitate associating network devices with users 102. For example, consider a user 102 attempting to locate or associate with a network device, such as service network device 106. Further consider that user 102, or an operating system and/or application software on behalf of the user, initiates a device association discovery step that the (non-expert) user 102 and service network device 106 are able to participate in.

Computing environment 100 can facilitate automatically determining where service network device 106 is physically located by discovering and identifying a desired service network device 106 and indicating this to the user 102 for the purpose of associating with service network device 106. For instance, the association can include determining where service network device 106 is physically located, which can include superimposing the network topology and the physical location of the device (e.g., as made available by server 138 and/or database server 140, and/or by printing or displaying a map on a visual display unit, on hardcopy, or an augmented reality type displays).

Alternatively or additionally, the service network device 106 can indicate its presence by a user-detectable and/or and application-detectable action. According to further aspects of the disclosed subject matter, a service network device 106 can create an output which is uniquely identifiable by the user (e.g., a printer printing a page identifiable by the user) to facilitate discovery of the device and or indentifying the correct device among other possible candidates. Further examples of the service network device 106 identifying itself can include making a sound (e.g., audible or non-audible) that is user detectable or detectable by a device carried by the user (e.g., a cellular phone or PDA), flashing a light (e.g., whether or not the light is in visible spectrum), and/or initiating a radio frequency (RF) beacon that a device user 102 is carrying can home in on to help locate and identify service network device 106.

According to still further aspects of the disclosed subject matter, computing environment 100 facilitates users 102 identifying themselves to a service network device 106, or the service network device 106 identifying users 102, once the user has located the correct device. Typically, a user can enter a password or a pin number, swipe a pass-card or corporate identification card, or other identification step for the purpose of granting access to the device resources and/or performing or retrieving a job. However, other examples can include physical interaction with the device (e.g., physically touching the device), performing a biometric identification step, or performing a task in close proximity to the device (e.g., speaking to or looking at a device with an attached microphone or camera) to facilitate users 102 identifying themselves to a service network device 106 or the service network device 106 identifying users 102.

It should be appreciated that network devices (e.g., user network device 104 and/or service network device 106) can be relatively simplistic devices lacking certain features to facilitate identification of user 102 or associating with user 102. Thus, particular aspects of the disclosed subject matter can be facilitated by server 138 and/or database server 140 in communication with service network device 106 and/or user network device 104. In this instance, server 138 and/or database server 140 can be configured to identify the service network device 106 (e.g., by medium access control (MAC) address) and to establish a trusted path to the service network device 106 and the associated authentication interface (e.g. keypad, microphone, camera, fingerprint reader, etc.) that user 102 is interacting with.

According to another aspect of the disclosed subject matter, computing environment 100 can facilitate creating the communication channel between user 102 and service network device 106. For example, part of the process of creating the communication channel can be performed during discovery and/or identification of service network device 106 using standard TCP/IP communications channels and protocols to create the communication path. In the event that user 102 is using a user network device 104 such as a PC from which a print job was sent, then the process of identification of service network device 106 with the PC can facilitate creating the communication path with service network device 106.

According to yet another aspect of the disclosed subject matter, computing environment 100 can facilitate performing customized actions for user 102 upon successful association (e.g., a secure association or otherwise) with service network device 106. For example, after user 102 has successfully associated (and securely associated if desired) with service network device 106, the service network device 106 can perform a customized action based in part on the user 102, the nature of security association, proximity of the user, a user profile, a device usage history, user local selections, device inventory or audit, nature of the communication channel, and/or user authentication credentials, and the like. As a further illustration, a customized action can include boosting the priority of jobs associated with that user (e.g., boosting the priority of print jobs in a queue for a user that is identified to be at the printer), releasing jobs on the service network device 106 that require physical presence of user 102 (e.g., printing a sensitive or secure job such as payroll information), adding service network device 106 to a roster or inventory of devices that are attached to the network for creation and/or updating of a device map and/or for auditing purposes.

Additionally, a further customized action can include performing the required device driver installation and setup using standard setting and/or as customized by an organization's IT staff. As a further example of a customized action, a user can associate with the nearest network enabled coffee machine. After discovering the nearest candidate device and finding its location, the network enabled coffee machine can retrieve coffee menu preferences for user 102 from server 138 and provide a customized coffee menu, and/or prepare a made to order beverage once the network enabled coffee machine identifies the user 102.

It is to be appreciated that various functions, components, or process steps can be combined or distributed via techniques known in the art or can be eliminated or reorganized according to system design considerations without departing from the scope of the claims appended hereto. For example, while some of the functions (e.g., locating network devices, discovering network devices, identifying devices and users, creating communication channels, and performing customized actions) are described as occurring in discrete elements or devices for purposes of illustration, it should be understood that such functions can be combined or distributed as desired. As an example, for association of a user 102 with a networked printer 134 via desktop computer 120, some or all of the described functions can be facilitated with the listed elements without the need for server 138 and/or database server 140. Further examples of such modifications will become apparent to those skilled in the art upon review of the various embodiments disclosed and claimed herein.

Device Discovery

Figure 2:
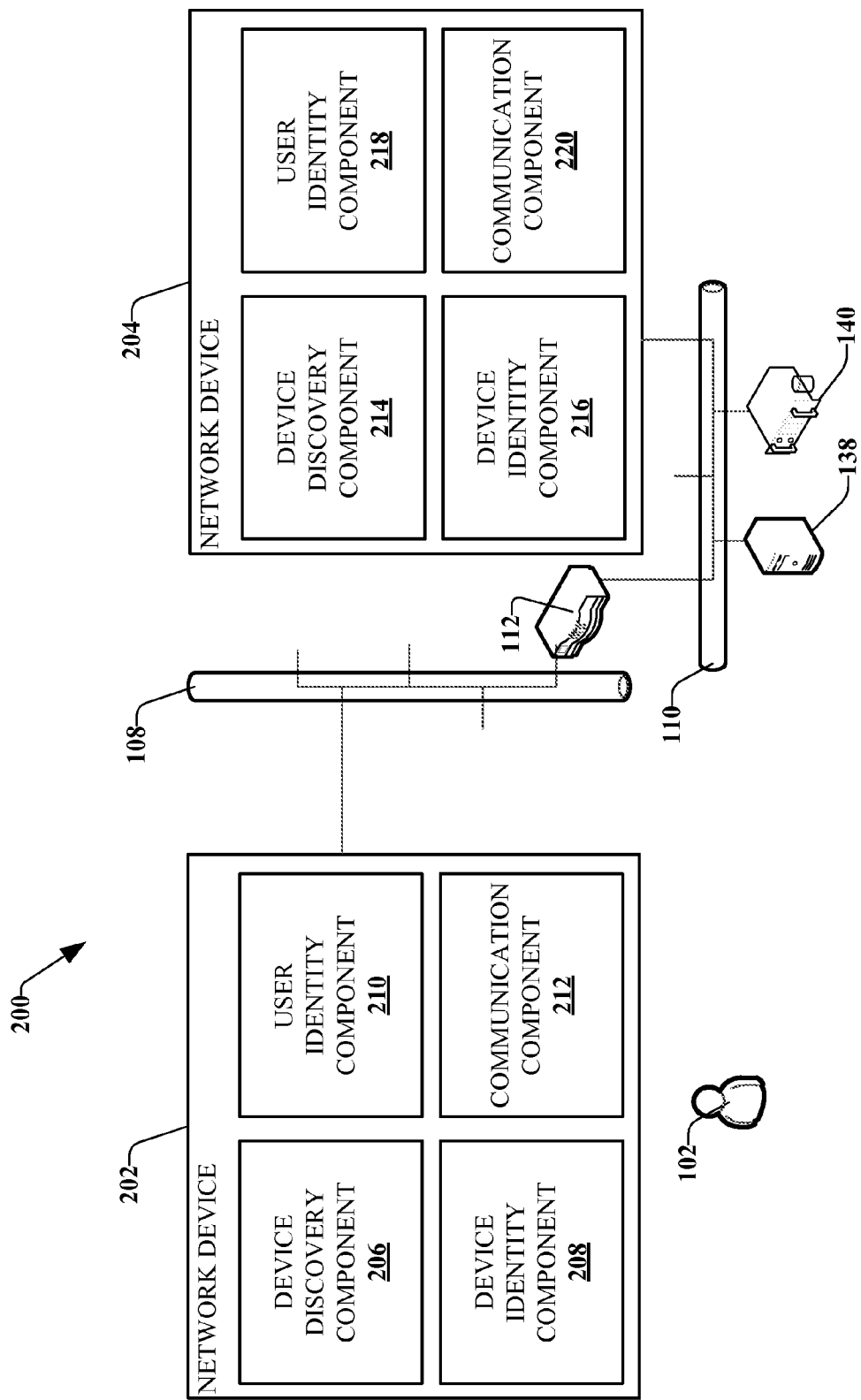
FIG. 2 illustrates an exemplary non-limiting block diagram of a system according to various embodiments of the disclosed subject matter.

FIG. 2 illustrates an exemplary non-limiting block diagram of a system 200 that facilitates associating network devices with users, according to various embodiments of the disclosed subject matter. As briefly described above with reference to FIG. 1, various non-limiting embodiments of the disclosed subject matter can comprise a user network device 104 and service network device 106. As further described, user network device 104 and service network device 106 can comprise more or less functionality than the exemplary devices described above with reference to FIG. 1 and can be either one or both of a user network device 104 and a service network device 106 as the context requires. Thus, while particular functions are described in terms of a user network device (e.g., as network device 202) or a service network device (e.g., as network device 204), it is understood that both can have more or less of the described functionality depending on the context.

Accordingly, system 200 can comprise network device 202 interconnected to network device 204 to facilitate associating network device 204 with user 102 via network device 202. According to aspects of the disclosed subject matter, network devices 202 and 204 can further comprise a device discovery component 206/214 to facilitate discovering candidate network devices and/or functions for a task or job of interest to user 102. Accordingly, the user 102 or other component (e.g., via an operating system and/or application software) on behalf of the user 102 can initiate a device association discovery step.

In addition, device discovery component 206/214 can facilitate using multiple disparate levels (e.g., more than one level) of discovery. For example, device discovery component 206/214 can discover candidate network devices on a network (or subset thereof), for instance, by using standard network device browsing capabilities of network device 202. However, as devices may be distributed across a large area (e.g., throughout a building), without more, the set of candidate network devices can be such that the set comprises an amount of network devices too numerous to assist user 102 in locating a device of interest. To that end, the set of candidate devices can be narrowed to facilitate discovering devices more proximal to the user 102 (e.g., in the same room or on the same floor of a building).

Accordingly, device discovery component 206/214 can facilitate narrowing the set of candidate device based on, for example, a device map created by superimposing the network topology and the physical location of the device (e.g., as made available by server 138 and/or database server 140 and/or by printing/displaying a map on a visual display unit, on hardcopy, or an augmented reality type displays). In addition, device discovery component 206/214 can facilitate determining from a previously associated network device (not shown) that a nearby device is signaling to the user. Accordingly, device discovery component 206 and/or 214 can facilitate signaling or reception of signals from nearby devices, such as by generating and/or receiving a RF beacon or other signal to facilitate narrowing the set of candidate devices. As a result, the previously associated device can inform the user of the location and/or identity of the potential candidate network device, based in part on the proximity to existing associated devices. Advantageously, the previously associated device sensing potential candidate network device signaling can be used to update the device map, which can also be useful for inventory an auditing purposes.

According to further aspects of the disclosed subject matter, device discovery component 206/214 can facilitate narrowing the set of candidate devices based on information derived from network configuration. For example, if two network devices are located on the same subnet and a third is located on a different subnet, it can be inferred that one of the devices on the same subnet as the network device 202 is a better candidate than the devices on a different subnet. Similarly, a similar inference is possible based on the minimum number of hops or other network statistics. As a result, discovery component 206/214 can facilitate performing and/or responding to network queries and analysis tools (e.g., sending or responding to Internet Control Message Protocol (ICMP) echo request packets (ping), a tracert or traceroute tool, etc.) for the purpose of providing additional discovery information to the components of system 200.

Until this point, the disclosed subject matter has been described in the context of discovering devices. However, a typical user has a greater affinity for performing some function rather than having an affinity for a particular device per se. Accordingly, system 200 can facilitate associating network devices with users based on a desired function. To that end, device discovery component 206/214 can facilitate discovering and associating with devices based on the functions that the device can perform.

Thus, system 200 can facilitate generating and providing, for each network device, a user-friendly or task oriented name or alias. For instance, device discovery component 206/214 can facilitate describing and storing (e.g., stored in database server 140 or other suitable storage component) the network supported functions associated with the device. For example, a typical MFD can perform print, copy, scan, and/or fax functions, which happen to be collocated within the same device. Thus, an associated device discovery component of such a network capable MFD could describe and store such network supported functions. As a result, when user 102 is interested in faxing a document, rather than merely discovery of fax machines, a device discover step could poll database server 140 (or other suitable storage component) to discover network supported fax functions.

Advantageously, by partially dissociating the task-oriented function from the device, system 200 facilitates associating user 102 to a network device having a fax function, which may be more convenient than the nearest standalone fax device. Thus, the user can associate to the function rather than the device. As a further example, if user 102 requires a camera, and a previously associated printer happened to have one (albeit not a core function of the printer), system 200 can use the association concept to direct user 102 to the printer with the camera function. As is further described below with respect to device and user identity, a user 102 running a discovery step for a camera can be recognized by an as-yet associated printer having a camera function that can identify when the user walks into the space with a network available camera function.

As a further advantage of partially dissociating the task-oriented function from the device, system 200 can facilitate bundling or substitution, the result of which can lead to more efficient use of IT assets. For example, an available scanner can partially substitute for a fax function in some circumstances, whereas bundling the scanner with a voice over internet protocol (VOIP) application can eliminate the need for a separate fax device. As a result of partially dissociating the task-oriented function from the device, system 200 can also facilitate such functions as resource partitioning between the bundles of devices or functions, which can include, for example, a bundle of devices or functions based on a task-oriented functions (e.g., the capability to display a video, the capability to serve as a video source, the capability to serve as a network attached storage, usage of processing cycles on an unused desktop computer, etc.).

Additionally, an association on the basis of a function of a device having multiple functions or bundled with other devices functions can further simplify the association process. For instance, because the discovery step has already been performed in associating with a function of the device or a bundle, it can be presumed that the topological and physical mapping has already been performed for the existing association. Alternatively, once a function of a device or a bundle of capabilities attached to a device or sets of devices has been associated with a user, the additional available functions can be enumerated by software, which could be made available for further associations as future user tasks arise. For example, a fax function of a MFD can be associated with a user 102. Later during a discovery step when user 102 seeks a card reader to read the contents of a memory stick, the disclosed subject matter can facilitate directing user 102 to the previously associated MFD having the required functionality as previously enumerated.

Device Identity

Referring again to FIG. 2, once a set of candidate devices has been narrowed, user 102 can further narrow the physical location of the device of interest. For instance, the network topology can facilitate generating an initial set of candidate network devices, that can then be presented for selection. In other words, from among a group of devices centrally located or distributed across an office space, the disclosed subject matter can facilitate physically locating the network device 204 (e.g., to pick up a print job, scan a document etc.). Thus, in addition to providing device discovery based on network topology and information derived therefrom, network device 204 can facilitate indicating to the user the identity of itself (e.g., network device 204).

According to further aspects of the disclosed subject matter, network devices 202 and 204 can further comprise a device identity component 208/216 to facilitate determining the identity and physical location of the device of interest (e.g., network device 204). For example, device identity component 208/216 can facilitate identifying the device of interest (e.g., network device 204) to user 102.

As an illustration, consider user 102 attempting to locate and setup a nearby printer. In this case, user 102 could use network device 202 (e.g., a desktop PC) to initiate a device association discovery step for a nearby printer for the job of interest, which in this case, can be described as network device 204. Thus, as described above, device discovery component 206 can facilitate generating a set of candidate devices for the job of interest, which could then be narrowed to a useable set of candidate devices. Assuming that network device 204 (e.g., the desirable printer) is among the useable set of candidates, then user 102 or other component (e.g., via an operating system and/or application software) on behalf of the user 102 can select network device 204. As a result, device identity component 216 of network device 204 can then assist user 102 in narrowing the physical location of the device.

Accordingly, device identity component 216 (and depending on the context, device identity component 208) can facilitate signaling identity of the associated network device to a user 102. For example, in addition to locating a device of interest based in part on a virtual map of devices by location, device identity component 216 can facilitate transmitting a beacon such as an RF beacon. In that instance, device identity component 208 of a network device 202 in the form of a handheld or portable device (e.g., a cellular phone, a PDA, a laptop, etc.) can be configured appropriately to facilitate homing in on a transmitted beacon to locate network device 204.

Advantageously, the disclosed subject matter can facilitate indicating the presence of the network device to a user in multiple ways to locate and distinguish between collocated devices. For example, a hearing impaired user would desire one or more visual indications that a sight impaired user would not. In addition, it may be difficult to distinguish between two collocated network devices based on only one type of indication.

Accordingly, further examples of such device identity component 216 signaling as dictated to network device 204 by network device 202 can include lights blinking (e.g., in a sequence, color, or pattern) whether or not the light is in the visible spectrum, emission of a sound whether or not the sound is audible (e.g., buzzers, playing a particular song, emission of ultrasonic or subsonic waves), and/or any kind of RF energy that a user might be able to home in on, and so on. Other forms of device identity signaling can include, for example, using network device 202 to instruct the network device 204 (e.g., a printer from among a bank of centrally located devices) to print out a user recognizable page (e.g., with a unique number or pattern such as the user's picture) or displaying or projecting an image of the user's face on a display or other surface such as on the ceiling. Additional forms of device identity signaling can include user-recognizable device gestures, such as using moveable parts on the device or moveable items near and associated with the device.

As described above, such signals can be of a form as to be human recognizable with or without the aid of a device. For example, device identity component 216 of network device 204 can signal its identity and location in an inaudible range, which can be identified and located using sound signal recognition of a device identity component 208 of a network device 202 in the form of a handheld or portable device (e.g., a cellular phone, a PDA, a laptop, etc.).

As a result, according to an aspect of the disclosed subject matter, a third device (not shown) (e.g., such as a cell phone, pen computer, media player, corporate identification card, and the like) can facilitate mediating the introduction of the user 102 to the network device 204. For instance, using a suitably configured device identity component (e.g., such as a device identity component 208 of network device 202) of a device associated with a user, a user 102 can receive a pattern sample (e.g., a signal sample such as a sound sample, an RF energy sample, or other information). This pattern sample can facilitate matching a pattern generated by a network device 204, as dictated by the network device 202.

For example, using network device 202, user 102 can select network device 204 for association. Then, using a user-associated third device (e.g., a cell phone or other suitable device), user 102 can receive a signal sample, such as a sound sample, that matches a pattern that network device 202 directs the device identity component 216 of network device 204 to generate, in order to facilitate identification and location of network device 204. For instance, using an appropriately configured cellular phone application, the user 102 could be notified by the third device that network device 204 is within close proximity (as determined by the cellular phone application recognizing a pattern match), the notification of which can be by vibrations, beeps with increasing frequency, indications on the device graphical user interface (GUI), or other human recognizable signals when the user 102 nears network device 204 (e.g., within a user configurable proximity, for which the signal can be recognized by the cellular phone).

User Identity

Referring again to FIG. 2, once the user has identified and located the correct device of interest, according to an aspect of the disclosed subject matter, the device can facilitate recognizing the user. Accordingly, network device 204 (and depending on the context, network device 202), can comprise a user identity component (e.g., user identity component 218 or 210) to facilitate user recognition. For example, in certain circumstances it can be desired to limit association to network device 204 to authorized users. For instance, it may be desired to restrict access to a network printer to human resources department personnel for privacy protection. As such, association with network device 204 can be limited based on recognition of user identity, in addition to traditional access limitation forms. As a further example, network device 204 (e.g., a network printer) can authorize release of a confidential print job only when a user 102 initiating the job is recognized to be at network device 204.

Accordingly, user identity component 218 (and depending on the context, user identity component 210) of the associated network device can facilitate recognition of a user 102. As an example, the user identity component of network device 204 (and depending on the context, network device 202) can facilitate identifying the user, for example, by touch such as a user entering in a password passphrase or pin number, visual recognition (e.g., facial recognition, etc.) in the case of a network device 204 having video capture capability, audio capture and/or voice recognition, and/or by sensing something that is associated with and carried by the user 102 (e.g., a corporate identification card). As a further example, user identity component 210 can facilitate device recognition of the user based in part on packets exchanged over a wireless network, or energy or pattern of energy emitted in the radio frequency band, optical band, near-optical band, or sonic or subsonic bands. Additionally, during device discovery and selection of a device of interest, or thereafter, user 102 and a suitably configured network device 204 can be directed (e.g., by network component 202 used to discover network device 204) to perform and accept a mutual acceptable gesture as a form of user recognition.

In the event that it is especially important to that the association of network device 204 is to a human user 102 (e.g., for security purposes), as opposed to an operating system and/or a software application acting on behalf of or in lieu of user 102, then the user identity component of network device 204 (and depending on the context, network device 202) can be configured to require recognition based on human forms of identification (e.g., biometric identification). For instance, user identity component 218 of network device 204 can be configured to use audio capture and voice recognition to facilitate determining that the associating entity is human as opposed to some rogue device that has been surreptitiously installed to detect the network devices and create covert communication channels.

According to an aspect of the disclosed subject matter, a third device (not shown) (e.g., such as a cell phone, pen computer, media player, corporate identification card, and the like) can facilitate recognition of the user 102 by the network device 204. For instance, using a suitably configured user identity component (e.g., such as a user identity component 210 of a network device 202) of a device associated with a user, a user 102 can submit to a sampling algorithm (e.g., voice capture, picture from a camera phone, or other sampling algorithm).

Then, when a user desires to associate with network device 204 requiring such a sample, but for which network device 204 lacks the required input (e.g., not capable of sampling audio or not equipped with a camera), this third device can transmit this information to network device 204 directly via a communication path (e.g., Bluetooth™, infrared, or other wired or wireless communication path) to facilitate user 102 recognition by network device 204. Alternatively, such a sample can be transmitted to a back-end authentication channel for recognition, which in return could set a cookie, certificate, or other authorizing credentials on the third device. In turn, the user 102 can then use the third device to facilitate recognition by network device 204 by transmitting the authorizing credentials directly to network device 204 via a communication path (e.g., Bluetooth™, infrared, or other wired or wireless communication path).

It is to be appreciated that the various functions, components, or process steps can be combined or distributed via techniques known in the art or can be eliminated or reorganized according to system design considerations without departing from the scope of the claims appended hereto. For example, while some of the functions or components are described as occurring in discrete elements or devices for purposes of illustration, it should be understood that such functions or components can be combined or distributed as desired. As an example, although a network device 204 can comprise some or all of the user identity component functions as described, at least some of these functions can be facilitated in part by server 138, database server 140, and/or a mediating third device.

Communication Channels

Referring again to FIG. 2, after or concurrently with locating network device 204 (e.g., network device 204 is discovered and identified as the device of interest) and device identifying the user, the disclosed subject matter, according to an aspect thereof, can facilitate setting up one or more communication channels between user 102 (e.g., via an operating system and/or an application of network device 202 acting on behalf of user 102) and network device 204. To that end, network devices 202 and 204 can comprise a communication component (e.g., communication component 212 and 220 respectively) to facilitate setting up one or more communication channels between user 102 and network device 204.

Accordingly, communication component 212 and 220 can facilitate establishing one or more of the communications channels during locating network device 204 (e.g., network device 204 is discovered and identified as the device of interest) and/or during user recognition, according to standard TCPIP communications channels and protocols (or other suitable channels and protocols), wired and/or wireless networking standards, and so on. For example, if user 102 is attempting to associate via network device 202, such as a desktop PC, and from which a print job was sent, then network device 202 discovery and identification of network device 204 can establish one or more of the communications channels according to standard protocols. Additionally, one or more of the communications channels can be established based in part on identifying the device of interest, device recognition of the user, device recognition that user 102 is in proximity to the device, and/or authentication of the user, and so on.

In addition to establishing one or more of the communications channels as described, communication component 212 and 220 can facilitate communicating with third devices for the purpose of mediating the association between the user 102 and the network device 204. According to further aspects of the disclosed subject matter, communication component 212 and 220 can facilitate establishing secure communications channels with user 102 for the purpose of establishing a secure association according to desired security and privacy restrictions. According to yet another aspect of the disclosed subject matter, communication component 212 and 220 can facilitate communicating with other network connected devices such as, for example, server 138 and/or database server 140 for such purposes as user identification, device mapping and inventory or auditing, user authentication, and/or downloading or storing preference information, and the like.

Customized Action

In addition to facilitating associating network devices with users, the disclosed subject matter, in one aspect thereof, can facilitate performing customized action by network device 204 based in part on the association with user 102. For example, based on the nature of the security association of user 102, upon an association (e.g., secure or otherwise) with user 102, network device 204 can perform a customized action. As a further example, if a securely associated user is determined to be in the room with the device (e.g., a printer) the device can take a customized action such as boosting the priority of a print job in a print queue. Additionally, if a print job is a secure job, because the authorized user 102 is in the room, the print job can be processed without needing to enter a password or other action on the device to release the job for printing (or conversely delaying a print job of sensitive information until user 102 is physically present to pick up the material, etc.).

It is to be appreciated that such customized action can include anything that can be facilitated by, for example, running a scripted task or profile based action. For instance, upon establishing a secure user to device association according to the disclosed subject matter, a network enabled coffee machine can download user 102 coffee preferences (e.g., from server 138 and/or database server 140) associated with the user and either provide a customized menu or prepare a made to order beverage without delay. As a further example, upon establishing a secure user to device association according to the disclosed subject matter, a network enabled video display unit can identify that securely associated user 102 is present and download and run a scripted task that, for example displays what certain stock prices are, displays the user's latest RSS feeds, and so on.

In addition, for auditing and inventory purposes, it is useful to know where a network device is physically located. Thus, the disclosed subject matter can facilitate auditing and inventory of network devices by binding physical location with network topology, which could happen, for instance, when a network device to user association occurs. As an example, a customized action for devices that do not already have a physical location mapped to network topology (e.g., for auditing and inventory purposes or to facilitate device discovery and identification), user 102 can be prompted to enter location identifying information as part of the association process.

Additionally, as described above, a mapped network device 204 in a partial map of network devices can make use of device identity component 216 to facilitate identifying new network devices that have yet to be mapped by assigning a provisional location of new network devices according to the proximity with mapped network device 204. Accordingly, user 102, upon initial discovery of the device can be given this provisional location information for device identification and location purposes. Upon successful identification of the new network device by user 102, a customized action for the new network device can include prompting user 102 to confirm or update the provisional location information.

Figure 3:
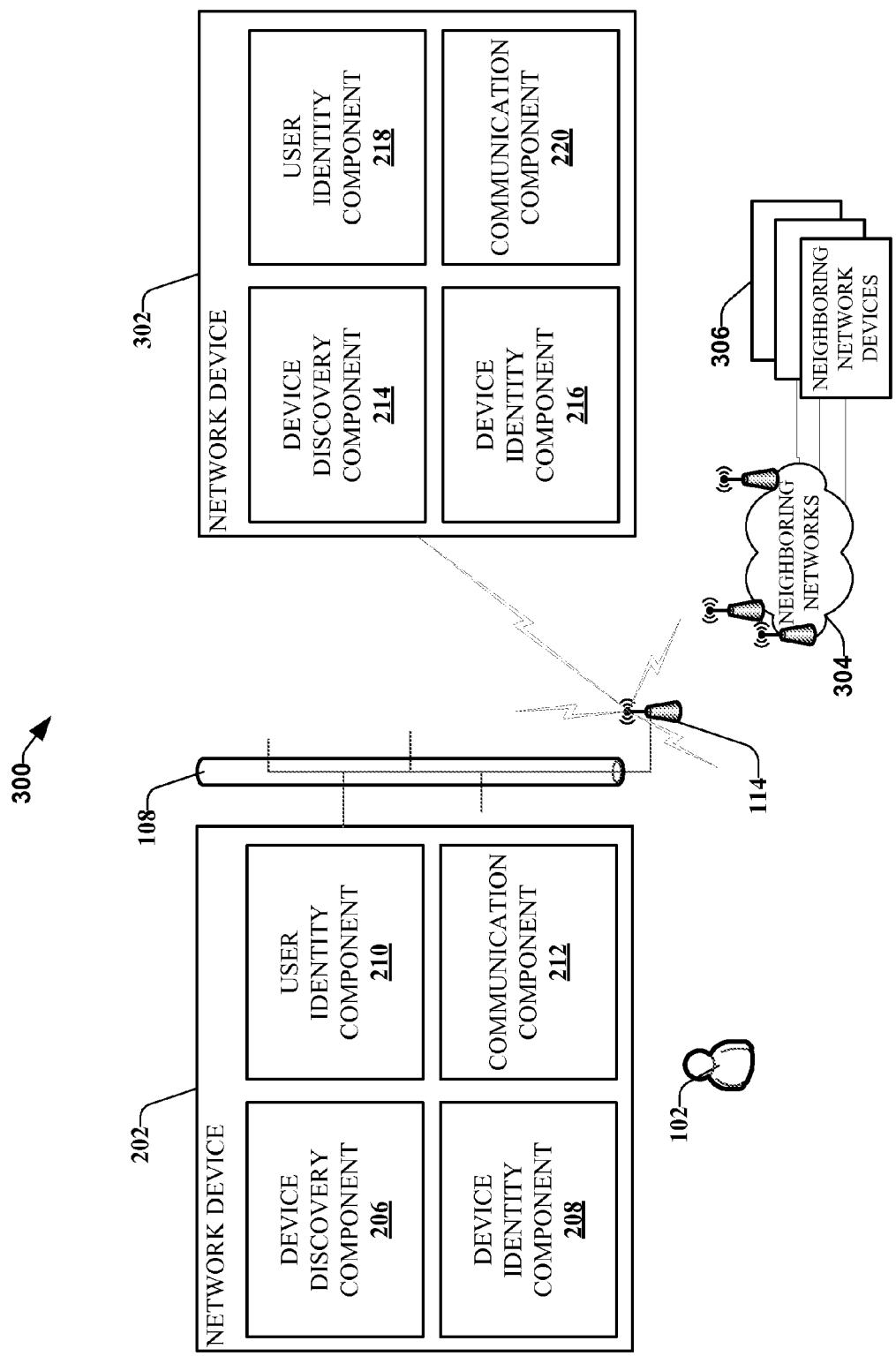
FIG. 3 depicts an exemplary non-limiting system for associating network devices with users according to various embodiments of the disclosed subject matter.

FIG. 3 depicts an exemplary non-limiting system 300 for associating network devices with users according to various embodiments of the disclosed subject matter. For the purpose of illustration and not limitation, system 300 is described as comprising a user 102 and an associated desktop personal computer (e.g., network device 202) connected to a network 108 including a wireless access point 114.

Suppose that user 102 desires the introduction of a device to the wireless network (e.g., served by the wireless access point 114 owned by user 102), such as a wireless network printer (e.g., as depicted by network device 302), a suitably capable server, a wireless networking capable refrigerator, etc., and to be controlled by user 102. Further suppose that because user 102 and the associated network components (e.g., network 108 and wireless access point 114) are located in an apartment building, neighboring networks 304 (e.g., including further wireless access points) and neighboring network devices can be located within the relevant proximity of wireless access point 114. As a result, if one of the wireless network devices (e.g., network device 302, wireless access point 114, etc.) owned by user 102 sends packets wirelessly, the packets can also received by neighboring networks 304 (e.g., including further wireless access points) in neighboring apartments.

Thus, while wireless network printer (e.g., as depicted by network device 302) can be physically located (e.g., by noting that the device is in the apartment of user 102), device 302 can be connected to the network (such as by obtaining an internet protocol (IP) address via dynamic host configuration protocol from presumably open wireless access point 114), and yet device 302 can still not be visible to user 102. That is, the issue of locating the device and/or identifying the device can be partially solved by virtue of the nature of the problem (e.g., that there is one device to be added and it is in the same room as user 102). However, the issue remains for user 102 to determine which devices are located on the network of interest (e.g., served by wireless access point 114 owned by user 102). Specifically, user 102 desires a unique association with network device 302 via wireless access point 114 and to the exclusion of devices and networks not owned by user 102. For instance, one of the neighboring devices 306 can include the same or similar wireless network printer, the neighboring wireless network printer can be associating with open wireless access point 114 owned by user 102, and/or wireless network printer (e.g., as depicted by network device 302) can be associating with one of the open wireless access points of neighboring networks 304.

As a result, the problem remains for user 102 to create a secure association with network device 302 via network device 202 (e.g., the desktop personal computer). Thus, as described above, system 300 can facilitate associating network device 302 with user 102. For instance, device discovery component 206 can facilitate using disparate levels of discovery to discover network device 302 by, for example, using a signal strength indication (e.g., from wireless access point 114) of device associated with wireless access point 114, network topology and/or information derived from network topology, response time of the device during device discovery, etc. However, network device 202 might not be able to discern between signal strength and/or response time indications based on a difference in scale such as between adjacent apartments.

After narrowing a set of candidate devices, user 102 can be provided an opportunity to select a candidate device. In response to such a selection, network device 302 can be instructed to provide an indication of identity to user 102 as described above. For instance, device identity component 216 can provide a sequence, color, pattern of flashing lights, and/or other forms of device identification recognizable by user 102. In addition, if wireless signal strength was the only means of discovery and identification of network device 302, then there could be a danger of eavesdropping. As a result, identity component 216 can facilitate generating a limited range signal (such as a test page with a user recognizable pattern, an ultra wideband signal or other RF local loop, and/or an audio or visual signal, and the like) to complete the association, once user 102 is in close proximity to the device.

Once user 102 has identified the network device 302, the network device 302 can facilitate identifying the user. In this example, user identity component can facilitate identifying user 102, for example by requiring entry of a one-time passphrase printed on a test page (thus verifying user identity by proximity), through intermediation by a portable device, and/or other forms of user identification recognizable by network device 302, as described above. Once the network device 302 has identified the correct user 102, the association can be completed by establishing any remaining desired communications channels. In addition, network device 302 can perform a customized action as described above. For example, upon sensing that one or more of the communication channels set up during the association is over an open wireless access point 114, network device can prompt user 102 to set up a strong administrative password on the network device 302, suggest a more secure wireless access point configuration, etc.

Figure 4:
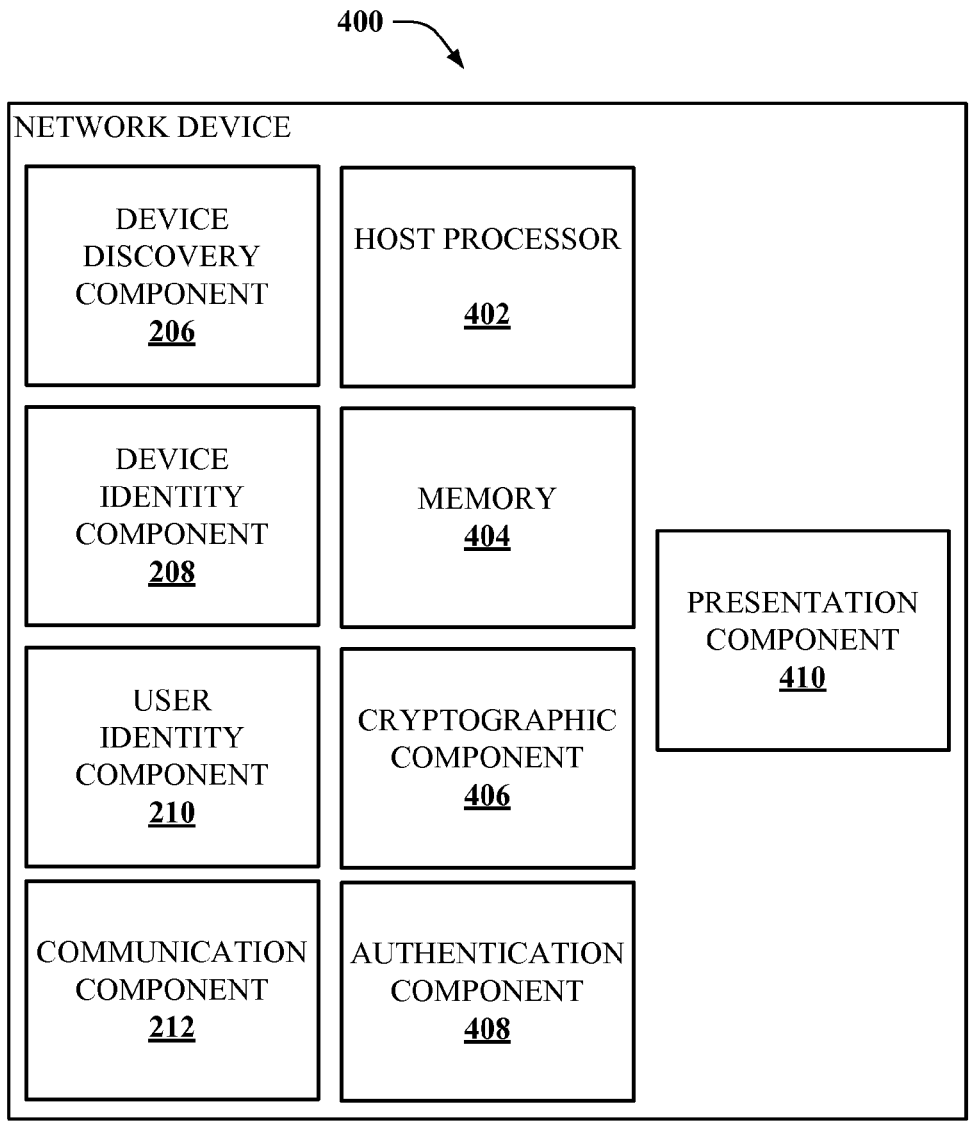
FIG. 4 illustrates an exemplary non-limiting block diagram of a network device for practicing various aspects of the disclosed subject matter.

FIG. 4 illustrates an exemplary non-limiting block diagram of a network device 400 for practicing various aspects of the disclosed subject matter. As briefly described above with reference to FIGS. 1 and 2, various non-limiting embodiments of the disclosed subject matter can comprise more or less functionality than those exemplary devices therein, depending on the context. In addition, a network device as described can be either one or both of a user network device 104 and a service network device 106 as the context requires and as further described above in connection with FIGS. 1 and 2. For instance, in some circumstances, a user network device 104 can comprise a subset of the functionality of a service network device 106, and/or service network device 106 can comprise a subset of the functionality of a network device 104. It is to be appreciated that while the functionality of network device 400 is described in a general sense, more or less of the described functionality may be implemented, combined, and/or distributed (e.g., among network devices, servers, databases, and the like), according to context, system design considerations, and/or marketing factors, and the like. Thus, as described above, network device 400 can include device discovery component 206, device identity component 208, user identity component 210, and communication component 212.

In addition, network device 400 can include a host processor 402 that can be associated with a memory 404 to facilitate storage of data and/or instructions for performing functions associated with and incident to the disclosed subject matter as described herein. The host processor 202 can be associated with a cryptographic component 406. In accordance with an aspect of the disclosed subject matter, cryptographic component 406 can provide symmetric cryptographic tools and accelerators (e.g., Twofish, Blowfish, AES, TDES, IDEA, CAST5, RC4, etc.) to facilitate encrypting and/or decrypting data. Thus, cryptographic component 406 can facilitate securing data being written to, stored in, and/or read from the memory 404, transmitted to or received from a connected network, and/or creating a secure communication channel as part of a secure association of network device 400 with a user to protected data can only be accessed by those entities authorized and/or authenticated to do so. To the same ends, cryptographic component 406 can also provide asymmetric cryptographic accelerators and tools (e.g., RSA, Digital Signature Standard (DSS), and the like) in addition to accelerators and tools (e.g., Secure Hash Algorithm (SHA) and its variants such as, for example, SHA-0, SHA-1, SHA-224, SHA-256, SHA-384, and SHA-512).

Network device 400 can further include an authentication component 408 that can solicit authentication data from a user 102 or other device (e.g., an operating system and/or application software) on behalf of user 102, and, upon receiving the proper authentication data so solicited, can be employed, individually and/or in conjunction with information acquired and ascertained as a result of biometric modalities employed, to facilitate associating network device with user 102. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 408. PKI arrangements can provide for trusted third parties to vet, and affirm, entity identity through the use of public keys that typically can be certificates issued by trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

In addition to forms of determining user identity described above in connection with FIGS. 2 and 3, the authentication component 408 can implement one or more machine-implemented techniques to identify a user 102 or other device (e.g., an operating system and/or application software) on behalf of user 102, by the user's unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

Referring again to FIG. 4, network device 400 can also include a presentation component 410, which can be associated with the host processor 402, and which can facilitate associating network device 400 with user 102. The presentation component 410 can provide various types of user interfaces to facilitate interaction between a user 102 and any component coupled to the host processor 402. In addition to providing one or more indications to facilitate location and identification of a network device of interest to user 102 as described above, presentation component 410 can provide one or more graphical user interfaces (GUIs), command line interfaces, structured and/or customized menus, and the like. For example, a GUI can be rendered that provides a user with a region or means to load, import, read, etc., data, and can include a region to present such results. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 402.

The user can also interact with the regions to select and provide information via various devices such as a mouse, a roller ball, a keypad, a keyboard, touchpad, touch screen, a pen and/or voice activation, for example. Typically, a mechanism such as a push button or the enter key on the keyboard can be employed to facilitate entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards of a computer) and/or displays (e.g., black and white, EGA, or other video display unit of a standalone device such as an LCD display on a network printer) with limited graphic support, and/or low bandwidth communication channels.

As depicted, network device 400 is described as a monolithic device. However, it is to be appreciated that the various components and/or the functionality provided thereby can be incorporated into the host processor 402 or provided by other connected devices. Accordingly, it is to be appreciated that more or less of the described functionality may be implemented, combined, and/or distributed (e.g., among network devices, servers, databases, and the like), according to context, system design considerations, and/or marketing factors.

Figure 5:
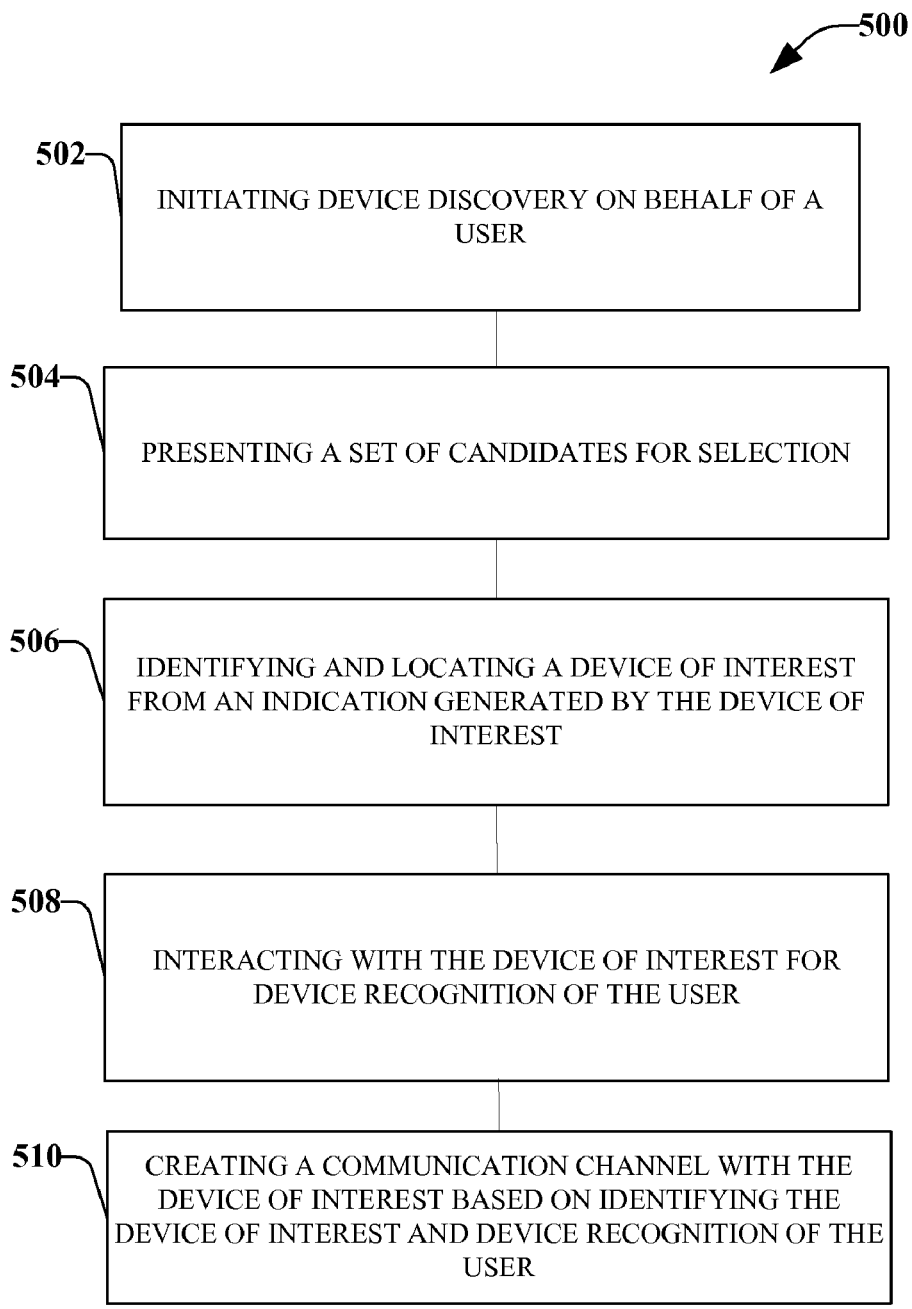
FIG. 5 illustrates a particular non-limiting high level methodology that facilitates associating network devices with users according to various aspects of the disclosed subject matter.
Figure 6:
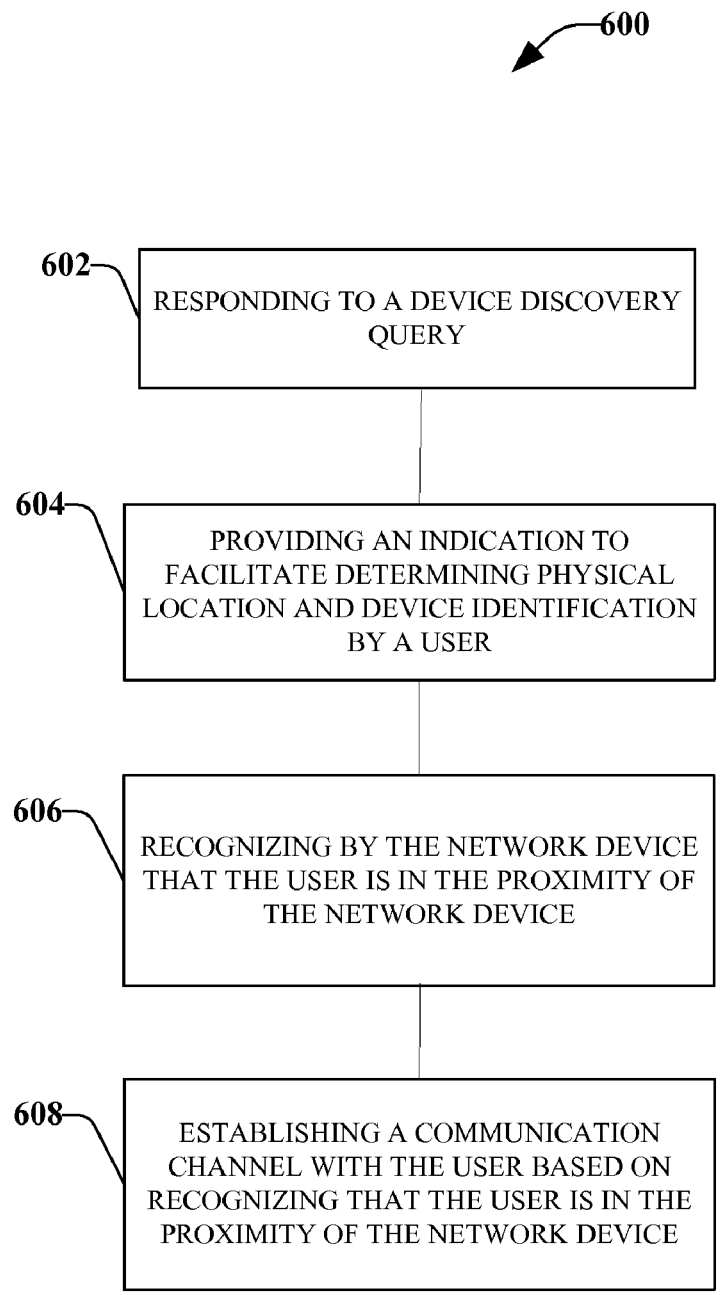
FIG. 6 illustrates a particular non-limiting high-level methodology that facilitates associating network devices with users according to various aspects of the disclosed subject matter.

In view of the exemplary systems and devices described supra, methodologies that can be implemented in accordance with the disclosed subject matter will be better appreciated with reference to the flowcharts of FIGS. 5 and 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks may be required to implement the methodologies described hereinafter.

FIG. 5 illustrates a particular non-limiting high-level methodology 500 that facilitates associating network devices with users according to various aspects of the disclosed subject matter. At 502, device discovery can be initiated on behalf of a user. For example, a user can direct a browser application to search for devices of interest on a desktop personal computer. As a further example, an operating system API can recognize that a user 102 has selected a print command and that no default printer is set up for user 102. In response, the operating system can initiate device discovery based on an inference that user 102 would ultimately desire to perform the discovery.

In addition, at 504, a set of candidates can be presented for selection. For instance, user 102 can be presented with a set of provisionally suitable devices on a display device for selection according to the user desired task or function. As another example, a set of candidates can be presented for selection by a software application or API that can facilitate automatic selection based on for example, a user profile, an inference based on previously associated devices, and so on. As a further example, a set of candidates can be a set of functional candidates (e.g., a set of candidates based in part on desired device functionality) such as one or more functions of a multi-function device, rather than a set of devices. Accordingly, the set of functional candidates can include bundled functions such as, two or more functions available from disparate devices (e.g., a scanner function and a VOIP function), which can be presented as substitutes for traditional functions (e.g., the scanner function and a VOIP function in lieu of a fax function). Additionally, the set of candidates can be narrowed based in part on a device map, strength of a signal received from a device during device discovery, response time of the device during device discovery, information derived from network topology, information derived from a previously associated device, or information derived from a network analysis tool, and the like.

At 506, a device of interest can be identified and located based in part on an indication generated by the device of interest. In addition to the indications available from the device of interest described above with reference to FIGS.

1-4, the indication generated by the device of interest can include an indication based in part on a profile of user 102. For example, a hearing impaired user can indicate a preference for visual indication, whereas a sight impaired would not. Additionally, as described above with reference to FIGS. 1-4, the identification and determining location of the device of interest can be mediated by a device associated with user 102. For example, a cell phone associated with user 102 can receive a signal, pattern, and so on that is intended to facilitate location and identification of the device of interest.

At 508, the device of interest can be interacted with to facilitate device recognition of the user. For example, as described above with reference to FIGS. 1-4, such interaction can include entering a passphrase, performing a device recognizable gesture, uttering a speech sample for voice recognition, using a fingerprint reader, and so on. Additionally, as described above with reference to FIGS. 1-4, the interaction with the device can be mediated by a device associated with user 102. For example, a cell phone associated with user 102 can receive a voice sample or other signal associated with the user and transfer this signal to the device of interest (e.g., via a Bluetooth™ link, a WLAN link, and so on), in the event that a device of interest cannot directly receive a voice sample (e.g., a device lacking a microphone) for recognition and identification of user 102.

At 510, at least one communication channel with the device of interest can be created based in part on identifying the device of interest and device recognition of the user. For example, as described above with reference to FIGS. 1-4, one or more communication channels can be established in the discovery, location, and/or identification of the device of interest. In addition, a communication channel can be established based on device recognition of user 102. Moreover, a secure communication channel with the device of interest can be established based on, for example, authentication credentials of user 102, the nature of the association, and so on.

Additionally, methodology 500 can further comprise performing a customized action (not shown) for a device of interest associated with user 102. For example, in addition to that described above with reference to FIGS. 1-4, a customized action can be performed based in part on a proximity of the user with the device of interest, a user profile, a device usage history, user local selections, a device inventory or audit, the nature of the communication channel, and/or user authentication credentials. For example, such customized action can include, elevating the priority of a task or releasing a secure task based on recognition of the user, prompting a user to confirm a provisional location of a newly associated device for auditing and inventory purposes, presenting a customized menu based on a user profile, and so on. As a further example, based in part on cached information about a previous association with a device, a determination can be made or inferred that a device has moved. For instance, if an attempt to remake an association based on cached information fails to have the same connection characteristics (e.g., signal strength, network latency, response time during device discovery, etc.), the device association has changed relative to some threshold, and/or a complete failure to re-establish the cached association could facilitate initiating a new discovery step with or without user intervention and/or notification.

FIG. 6 illustrates a particular non-limiting high-level methodology 600 that facilitates associating network devices with users according to various aspects of the disclosed subject matter. At 602, a device discovery query can be responded to. For instance, in addition to that described above with reference to FIGS. 1-5, in response to user 102 browsing for devices of interest on a desktop personal computer, a suitably configured device can respond to a query by, for example, indicating its presence on the network and enumerating its available functions, respond to a network analysis tool, transmit a RF energy beacon or other signal, and so on to facilitate discovery devices. In addition, a suitably configured network device can respond on behalf of another network device in response to a device discovery query. For example, if user 102 is attempting to discover a device of interest and a particular device of that class is unable to respond directly, a network device in proximity to the device of the particular device can respond on behalf of the particular device (e.g., by recognizing that user 102 is attempting to discover the device of interest and locally sensing the particular device).

In addition, at 604, at least one indication can be provided to facilitate determining physical location and device identification in response to receiving a device selection notification on behalf of the user. In addition to that described above with reference to FIGS. 1-5, such indications can include, flashing lights in a pattern, sequence, and/or color (e.g., whether or not in the visible spectrum), playing a sound (e.g., audible or inaudible), emitting RF energy (e.g., in the form of a beacon, or otherwise), and so on. As described above, the recognition of the indication can be facilitated with or without a mediating device that is associated with user 102.

At 606, the network device can recognize that the user is in the proximity of the network device. As described above with reference to FIGS. 1-5, such interaction can include entering a passphrase, performing a device recognizable gesture, uttering a speech sample for voice recognition, using a fingerprint reader, and so on. Additionally, as described above with reference to FIGS. 1-5, the interaction with the device can be mediated by a device associated with user 102, such as, by a cell phone associated with user 102 (e.g., that receives a voice sample or other signal associated with the user and transfer this signal to the device of interest for user identification (e.g., via a Bluetooth™ link, a WLAN link, and so on)). As a result, even for devices of interest that cannot directly receive a voice sample (e.g., a device lacking a microphone), methodology 600 facilitates identification and recognition of user 102.

At 608, a communication channel can be established with the user based in part on recognizing that the user is in the proximity of the network device. As described above with reference to FIGS. 1-5, one or more communication channels can be established in the discovery, location, and/or identification of a device of interest. In addition, a communication channel can be established based on device recognition that user 102 is in the proximity of the device. Moreover, a secure communication channel with the device of interest can be established based on, for example, the authority of user 102 to associate with the network device, the nature of the association, and so on.

Additionally, methodology 600 can further comprise performing a customized action (not shown) for a device of interest associated with user 102. As described above with reference to FIGS. 1-5, a customized action can be performed based in part on a proximity of the user with the device of interest, a user profile, a device usage history, cached device association information, user local selections, a device inventory or audit, the nature of the communication channel, and/or user authentication credentials. For example, such customized action can include, elevating the priority of a task or releasing a secure task based on recognition of the user, prompting a user to confirm a provisional location of a newly associated device for auditing and inventory purposes, presenting a customized menu based on a user profile, and so on.

Exemplary Networked and Distributed Environments

One of ordinary skill in the art can appreciate that the disclosed subject matter can be implemented in connection with any computer or other client or server device, which can be deployed as part of a computer network, or in a distributed computing environment, connected to any kind of data store. In this regard, the disclosed subject matter pertains to any computer system or environment having any number of memory or storage units, and any number of applications and processes occurring across any number of storage units or volumes, which can be used in connection with associating network devices with users in accordance with the disclosed subject matter. The disclosed subject matter can apply to an environment with server computers and client computers deployed in a network environment or a distributed computing environment, having remote or local storage. The disclosed subject matter can also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices can have applications, objects or resources that implicate the systems and methods that facilitate associating network devices with users according to the disclosed subject matter.

Figure 7:
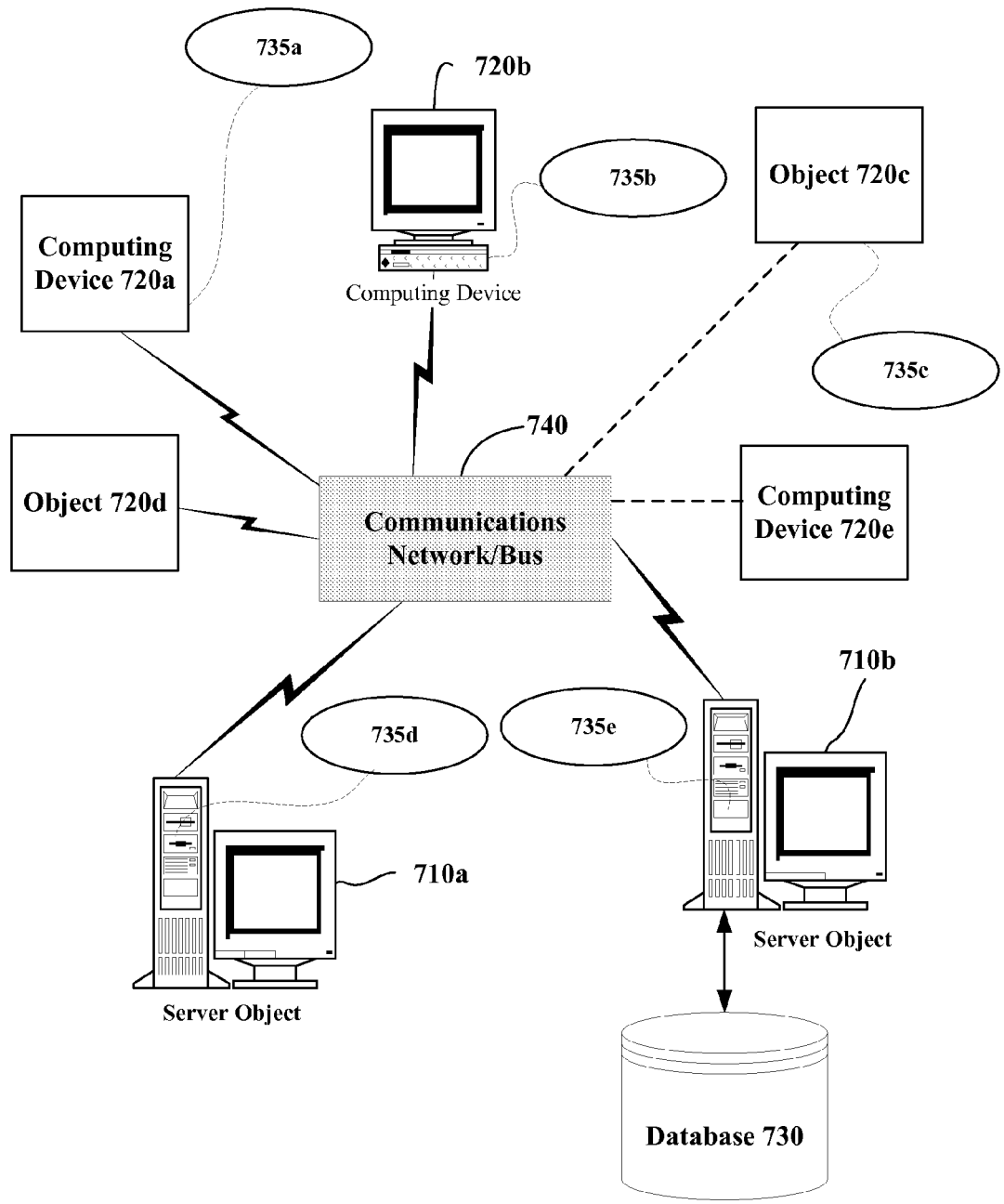
FIG. 7 is a block diagram representing an exemplary non-limiting networked environment in which the disclosed subject matter may be implemented.

FIG. 7 provides a schematic diagram of an exemplary networked or distributed computing environment. The distributed computing environment comprises computing objects 710a, 710b, etc. and computing objects or devices 720a, 720b, 720c, 720d, 720e, etc. These objects can comprise programs, methods, data stores, programmable logic, etc. The objects can comprise portions of the same or different devices such as PDAs, audio/video devices, MP3 players, personal computers, etc. Each object can communicate with another object by way of the communications network 740. This network can itself comprise other computing objects and computing devices that provide services to the system of FIG. 7, and can itself represent multiple interconnected networks. In accordance with an aspect of the disclosed subject matter, each object 710a, 710b, etc. or 720a, 720b, 720c, 720d, 720e, etc. may contain an application that might make use of an API, or other object, software, firmware and/or hardware, suitable for use with the systems and methods that facilitate associating network devices with users in accordance with the disclosed subject matter.

It can also be appreciated that an object, such as 720c, can be hosted on another computing device 710a, 710b, etc. or 720a, 720b, 720c, 720d, 720e, etc. Thus, although the physical environment depicted may show the connected devices as computers, such illustration is merely exemplary and the physical environment can alternatively be depicted or described comprising various digital devices such as PDAs, televisions, MP3 players, etc., any of which can employ a variety of wired and wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many of the networks are coupled to the Internet, which provides an infrastructure for widely distributed computing and encompasses many different networks. Any of the infrastructures can be used for exemplary communications made incident to associating network devices with users according to the designs of the disclosed subject matter.

In home networking environments, there are at least four disparate network transport media that can each support a unique protocol, such as Power line, data (both wireless and wired), voice (e.g., telephone) and entertainment media. Most home control devices such as light switches and appliances may use power lines for connectivity. Data Services can enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic can enter the home either as wired (e.g., Cat 3) or wireless (e.g., cell phones) and can be distributed within the home using Cat 3 wiring. Entertainment media, or other graphical data, can enter the home either through satellite or cable and is typically distributed in the home using coaxial cable. IEEE 1394 and DVI are also digital interconnects for clusters of media devices. All of these network environments and others that emerge, or already have emerged, as protocol standards can be interconnected to form a network, such as an intranet, that can be connected to the outside world by way of a wide area network, such as the Internet. In short, a variety of disparate sources exist for the storage and transmission of data, and consequently, any of the computing devices of the disclosed subject matter may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 7, as an example, computers 720a, 720b, 720c, 720d, 720e, etc. can be thought of as clients and computers 710a, 710b, etc. can be thought of as servers where servers 710a, 710b, etc. maintain the data that is then replicated to client computers 720a, 720b, 720c, 720d, 720e, etc., although any computer can be considered a client, a server, or both, depending on the circumstances. Any of these computing devices can be processing data or requesting services or tasks that implicate the methods that facilitate associating network devices with users in accordance with the disclosed subject matter.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques that facilitate associating network devices with users of the disclosed subject matter can be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) can be coupled to one another via TCP/IP connection(s) for high-capacity communication.

Thus, FIG. 7 illustrates an exemplary networked or distributed environment, with server(s) in communication with client computer (s) via a network/bus, in which the disclosed subject matter can be employed. In more detail, a number of servers 710a, 710b, etc. are interconnected via a communications network/bus 740, which can be a LAN, WAN, intranet, GSM network, the Internet, etc., with a number of client or remote computing devices 720a, 720b, 720c, 720d, 720e, etc., such as a portable computer, handheld computer, thin client, networked appliance, or other device, such as a VCR, TV, oven, light, heater and the like in accordance with the disclosed subject matter. It is thus contemplated that the disclosed subject matter can apply to any computing device in connection with which it is desirable to associate one or more network devices with one or more users according to the disclosed subject matter.

In a network environment in which the communications network/bus 740 is the Internet, for example, the servers 710a, 710b, etc. can be Web servers with which the clients 720a, 720b, 720c, 720d, 720e, etc. communicate via any of a number of known protocols such as HTTP. Servers 710a, 710b, etc. can also serve as clients 720a, 720b, 720c, 720d, 720e, etc., as can be characteristic of a distributed computing environment.

As mentioned, communications can be wired or wireless, or a combination, where appropriate. Client devices 720a, 720b, 720c, 720d, 720e, etc. may or may not communicate via communications network/bus 740, and can have independent communications associated therewith. For example, in the case of a TV or VCR, there may or may not be a networked aspect to the control thereof. Each client computer 720a, 720b, 720c, 720d, 720e, etc. and server computer 710a, 710b, etc. can be equipped with various application program modules or objects 735a, 735b, 735c, etc. and with connections or access to various types of storage elements or objects, across which files or data streams can be stored or to which portion(s) of files or data streams can be downloaded, transmitted or migrated. Any one or more of computers 710a, 710b, 720a, 720b, 720c, 720d, 720e, etc. can be responsible for the maintenance and updating of a database 730 or other storage element, such as a database or memory 730 for storing data processed or saved according to the disclosed subject matter.

Thus, the disclosed subject matter can be utilized in a computer network environment having client computers 720a, 720b, 720c, 720d, 720e, etc. that can access and interact with a computer network/bus 740 and server computers 710a, 710b, etc. that can interact with client computers 720a, 720b, 720c, 720d, 720e, etc. and other like devices, and databases 730.

Exemplary Computing Device

Figure 8:
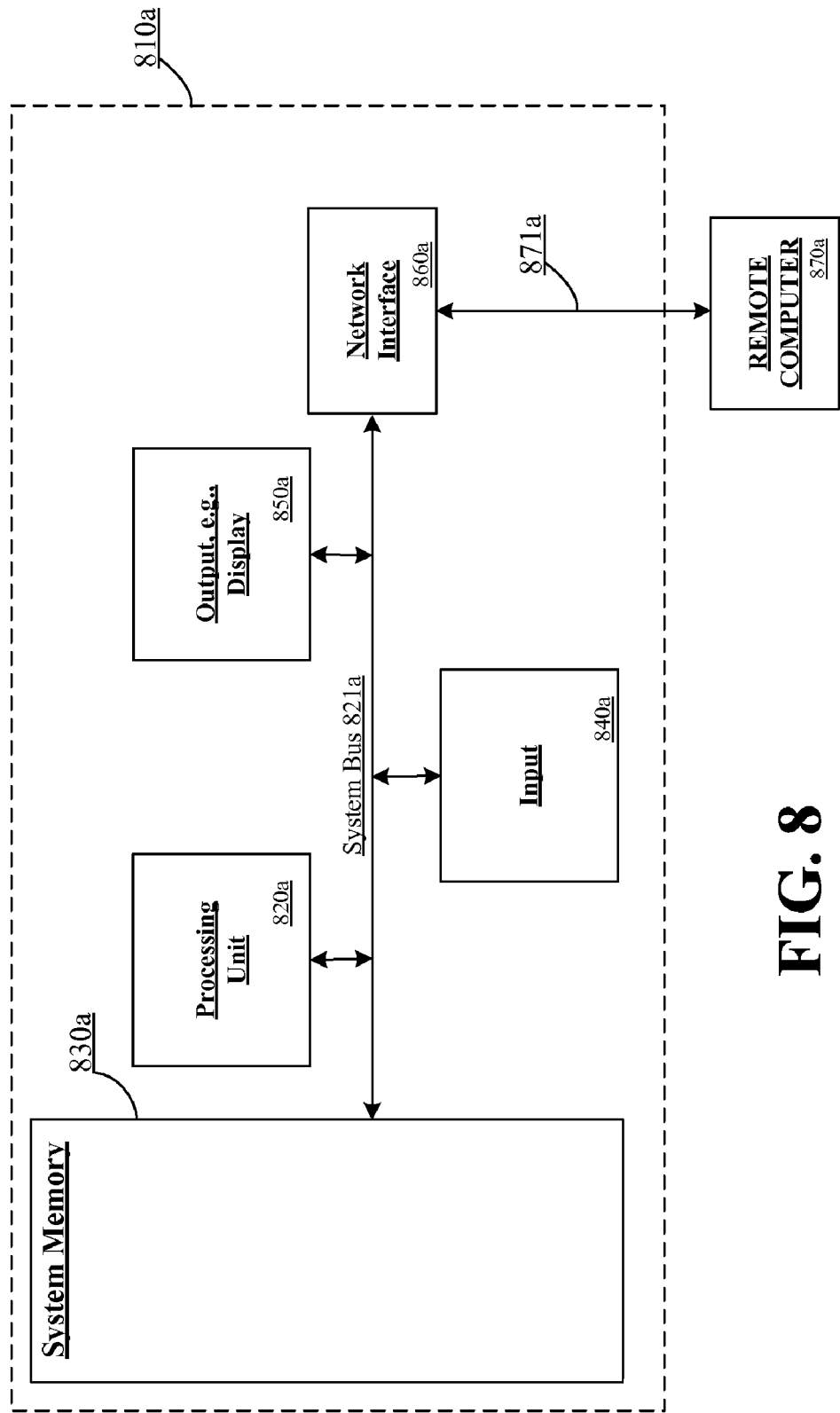
FIG. 8 is a block diagram representing an exemplary non-limiting computing system or operating environment in which the disclosed subject matter may be implemented.

As mentioned, the disclosed subject matter applies to any device wherein it can be desirable to associate one or more network devices with one or more users. It should be understood, therefore, that handheld, portable and other computing devices and computing objects of all kinds are contemplated for use in connection with the disclosed subject matter, i.e., anywhere that a device can associate with one or more users or otherwise receive, process or store data incident to associating network devices with users. Accordingly, the below general purpose remote computer described below in FIG. 8 is but one example, and embodiments of the disclosed subject matter may be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, the disclosed subject matter can partly be implemented via an operating system, for use by a developer of services for a device or object, and/or included within application software that operates in connection with the component(s) of the disclosed subject matter. Software may be described in the general context of computer executable instructions, such as program modules, being executed by one or more computers, such as client workstations, servers or other devices. Those skilled in the art will appreciate that the disclosed subject matter can be practiced with other computer system configurations and protocols.

FIG. 8 thus illustrates an example of a suitable computing system environment 800a in which the disclosed subject matter can be implemented, although as made clear above, the computing system environment 800a is only one example of a suitable computing environment for a media device and is not intended to suggest any limitation as to the scope of use or functionality of the disclosed subject matter. Neither should the computing environment 800a be interpreted as having any dependency or requirement relating to any one or combination of components illustrated in the exemplary operating environment 800a.

With reference to FIG. 8, an exemplary remote device for implementing the disclosed subject matter includes a general purpose computing device in the form of a computer 810a. Components of computer 810a can include, but are not limited to, a processing unit 820a, a system memory 830a, and a system bus 821a that couples various system components including the system memory to the processing unit 820a. The system bus 821a can be any of several types of bus structures including a memory bus or memory controller, a peripheral bus, and a local bus using any of a variety of bus architectures.

Computer 810a typically includes a variety of computer readable media. Computer readable media can be any available media that can be accessed by computer 810a. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 810a. Communication media typically embodies computer readable instructions, data structures, program modules or other data in a modulated data signal such as a carrier wave or other transport mechanism and includes any information delivery media.

The system memory 830a can include computer storage media in the form of volatile and/or nonvolatile memory such as read only memory (ROM) and/or random access memory (RAM). A basic input/output system (BIOS), containing the basic routines that help to transfer information between elements within computer 810a, such as during start-up, can be stored in memory 830a. Memory 830a typically also contains data and/or program modules that are immediately accessible to and/or presently being operated on by processing unit 820a. By way of example, and not limitation, memory 830a can also include an operating system, application programs, other program modules, and program data.

The computer 810a can also include other removable/non-removable, volatile/nonvolatile computer storage media. For example, computer 810a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 821a through a non-removable memory interface such as an interface, and a magnetic disk drive or optical disk drive is typically connected to the system bus 821a by a removable memory interface, such as an interface.

A user can enter commands and information into the computer 810a through input devices such as a keyboard and pointing device, commonly referred to as a mouse, trackball or touch pad. Other input devices can include a microphone, joystick, game pad, satellite dish, scanner, or the like. These and other input devices are often connected to the processing unit 820a through user input 840a and associated interface(s) that are coupled to the system bus 821a, but can be connected by other interface and bus structures, such as a parallel port, game port or a universal serial bus (USB). A graphics subsystem can also be connected to the system bus 821a. A monitor or other type of display device is also connected to the system bus 821a via an interface, such as output interface 850a, which can in turn communicate with video memory. In addition to a monitor, computers can also include other peripheral output devices such as speakers and a printer, which can be connected through output interface 850a.

The computer 810a can operate in a networked or distributed environment using logical connections to one or more other remote computers, such as remote computer 870a, which can in turn have media capabilities different from device 810a. The remote computer 870a can be a personal computer, a server, a router, a network PC, a peer device or other common network node, or any other remote media consumption or transmission device, and can include any or all of the elements described above relative to the computer 810a. The logical connections depicted in FIG. 8 include a network 871a, such local area network (LAN) or a wide area network (WAN), but can also include other networks/buses. Such networking environments are commonplace in homes, offices, enterprise-wide computer networks, intranets and the Internet.

When used in a LAN networking environment, the computer 810a is connected to the LAN 871a through a network interface or adapter. When used in a WAN networking environment, the computer 810a typically includes a communications component, such as a modem, or other means for establishing communications over the WAN, such as the Internet. A communications component, such as a modem, which can be internal or external, can be connected to the system bus 821a via the user input interface of input 840a, or other appropriate mechanism. In a networked environment, program modules depicted relative to the computer 810a, or portions thereof, can be stored in a remote memory storage device. It will be appreciated that the network connections shown and described are exemplary and other means of establishing a communications link between the computers can be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the disclosed subject matter can also be implemented via an operating system, or a "middle man" object, a control object, hardware, firmware, intermediate language instructions or objects, etc., such that the methods that facilitate associating network devices with users in accordance with the disclosed subject matter can be included in, supported in or accessed via all of the languages and services enabled by managed code, such as .NET code, and in other distributed computing frameworks as well.

There are multiple ways of implementing the disclosed subject matter, e.g., an appropriate API, tool kit, driver code, operating system, control, standalone or downloadable software object, etc. which enables applications and services to use the methods that facilitate associating network devices with users and related systems and devices of the disclosed subject matter. The disclosed subject matter contemplates use from the standpoint of an API (or other software object), as well as from a software or hardware object that facilitates associating one or more network devices with one or more users in accordance with the disclosed subject matter. Thus, various implementations of the disclosed subject matter described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the disclosed subject matter have been described in connection with various computing devices and network architectures, the underlying concepts can be applied to any computing device or system in which it is desirable to associate one or more network devices with one or more users. For instance, the methods that facilitate associating one or more network devices with one or more users according to the disclosed subject matter can be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the disclosed subject matter.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. One or more components can reside within a process and/or thread of execution and a component can be localized on one computer and/or distributed between two or more computers.

Thus, the methods and apparatus of the disclosed subject matter, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed subject matter. In the case of program code execution on programmable computers, the computing device generally includes a processor, a storage medium readable by the processor (including volatile and non-volatile memory and/or storage elements), at least one input device, and at least one output device. One or more programs that can implement or utilize the methods that facilitate associating one or more network devices with one or more users according to the disclosed subject matter, e.g., through the use of a data processing API, reusable controls, or the like, are preferably implemented in a high level procedural or object oriented programming language to communicate with a computer system. However, the program(s) can be implemented in assembly or machine language, if desired. In any case, the language can be a compiled or interpreted language, and combined with hardware implementations.

The methods and apparatus of the disclosed subject matter may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the disclosed subject matter. When implemented on a general-purpose processor, the program code combines with the processor to provide a unique apparatus that operates to invoke the functionality of the disclosed subject matter. Additionally, any storage techniques used in connection with the disclosed subject matter may invariably be a combination of hardware and software.

Furthermore, portions of the disclosed subject matter can be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

In view of the exemplary systems described supra, methodologies that can be implemented in accordance with the disclosed subject matter will be better appreciated with reference to the flowcharts of FIGS. 5 and 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks may be required to implement the methodologies described hereinafter.

Furthermore, as will be appreciated various portions of the disclosed systems and methods can include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the disclosed subject matter has been described in connection with the preferred embodiments of the various figures, it is to be understood that other similar embodiments can be used or modifications and additions can be made to the described embodiment for performing the same function of the disclosed subject matter without deviating therefrom. For example, while exemplary network environments of the disclosed subject matter are described in the context of a networked environment, such as a peer to peer networked environment, one skilled in the art will recognize that the disclosed subject matter is not limited thereto, and that the methods, as described in the present application can apply to any computing device or environment, such as a gaming console, handheld computer, portable computer, etc., whether wired or wireless, and can be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the disclosed subject matter in the context of particular programming language constructs, the disclosed subject matter is not so limited, but rather may be implemented in any suitable language to facilitate associating one or more network devices with one or more users, and related methods. Still further, the disclosed subject matter can be implemented in or across a plurality of processing chips or devices, and storage can similarly be effected across a plurality of devices. Therefore, the disclosed subject matter should not be limited to any single embodiment, but rather should be construed in breadth and scope in accordance with the appended claims.

What is claimed is:

1. A method facilitating association of a network device with a user, the method comprising:
    initiating device discovery on behalf of the user;
    presenting a set of candidates for selection based in part on at least one of a network topology or physical locations of the set of candidates;
    identifying and locating a device of interest based in part on an indication that is generated by the device of interest;
    interacting with the device of interest to facilitate device recognition that the user is in proximate;
    creating at least one communication channel with the device of interest based in part on the identifying the device of interest and on the device recognition of the user;
    narrowing the set of candidates for selection based in part on one of strength of a signal received from a device of the set of candidates during the device discovery or a response time of the device during the device discovery; and
    mediating at least one of the identifying and locating the device of interest or the interacting with the device of interest by a device associated with the user.

2. The method of claim 1, wherein the creating the at least one communication channel with the device of interest includes creating at least one secure communication channel with the device of interest based in part on authentication of the user.

3. The method of claim 1, wherein the presenting the set of candidates for selection includes creating the set of candidates based at least in part on a desired device functionality.

4. The method of claim 1, further comprising originating the indication generated by the device of interest based in part on a profile of the user.

5. The method of claim 4, wherein the profile of the user includes physical disability information pertinent to originating the indication generated by the device of interest.

6. The method of claim 1, further comprising performing a customized action based in part on the creating the at least one communication channel with the device of interest.

7. The method of claim 1, wherein the device recognition of the user includes recognition of the user based in part on at least one of packets exchanged over a wireless network, or energy or pattern of energy emitted in at least one of a radio frequency band, optical band, near-optical band, or sonic or subsonic bands.

8. A method facilitating associating a network device with a user, the method comprising:
    responding to a device discovery query;
    providing at least one indication to facilitate determining physical locations and device identifications of network devices in response to receiving a device selection notification on behalf of the user;
    recognizing by the network device of the network devices that the user is in proximity based at least in part on a human recognizable signal generated by the network device;
    establishing a communication channel with the user based in part on the recognizing that the user is in proximity;

performing by the network device a customized action specified for the user based on a physical distance between the user and the network device;

facilitating the user to narrow a set of candidates of the network devices for selection based in part on one of strength of a signal received from one network device of the network devices during a device discovery or a response time of the network device during the device discovery; and mediating at least one of the determining the physical locations and device identifications of the network devices or the recognizing that the user is in proximity by a device associated with the user.

9. The method of claim 8, further comprising responding by the network device to the device discovery query on behalf of another device.

10. The method of claim 8, wherein the recognizing by the network device that the user is in the proximity includes recognizing that a mediating device associated with the user is in the proximity.

11. The method of claim 8, wherein the performing of the customized action is based in part on one or more of a user's profile, a network device's usage history, user's local selections, a network device's inventory or audit, nature of the communication channel, or user's authentication credentials.

12. The method of claim 8, further comprising determining whether the user is authorized to associate with the network device.

13. The method of claim 8, further comprising establishing a secure communication channel with the user based in part on determining that the user is authorized to associate with the network device.

14. A device comprising means for performing the method of claim 8.

15. A system facilitating associating network devices with a user, the system comprising:

a device discovery component configured to:

generate or respond to a device discovery query to facilitate determining a set of candidate devices based on functions that the network device performs and functions that the user specifies, and narrowing the set of candidate devices for selection based in part on one of strength of a signal received from a device of the network devices during a device discovery or a response time of the device during the device discovery;

a device identity component configured to generate or recognize device identify signaling that enables the user to distinguish the device from other devices of the set of candidates;

a user identity component configured to recognize a user in proximity to a device of interest or to generate a signal to facilitate recognition that the user is in proximity to the device of interest based at least in part on a human recognizable signal generated by the device of interest; and a communication component configured to:

establish at least one communication channel between the device of interest and the user, and mediating at least one of the determining the set of candidate devices or recognizing the user in proximity by a device associated with the user.

16. The system of claim 15, further comprising an authentication component configured to establish the at least one communication channel between the device of interest and the user based on determination of whether the user is authorized to associate with the device of interest.

17. The system of claim 15, wherein the device of interest is configured to perform a customized action based in part on one or more of proximity of the user, a user's profile, a device of interest's usage history, cached device association information, user's local selections, a device of interest's inventory or audit, nature of the at least one communication channel, or user's authentication credentials.

18. The system of claim 15, wherein the communication component is further configured to allow mediation between a device of the network devices associated with the user and one or more of the device identity component or the user identity component.

* * * * *